United States Patent
Ueno et al.

(10) Patent No.: US 9,319,502 B2
(45) Date of Patent: Apr. 19, 2016

(54) MOBILE ELECTRONIC DEVICE, IMAGE PROJECTING METHOD AND PROJECTION SYSTEM

(75) Inventors: Yasuhiro Ueno, Yokohama (JP); Shigeki Tanabe, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 13/580,737

(22) PCT Filed: Feb. 24, 2011

(86) PCT No.: PCT/JP2011/054168
§ 371 (c)(1),
(2), (4) Date: Aug. 23, 2012

(87) PCT Pub. No.: WO2011/105502
PCT Pub. Date: Sep. 1, 2011

(65) Prior Publication Data
US 2012/0313974 A1    Dec. 13, 2012

(30) Foreign Application Priority Data
Feb. 24, 2010    (JP) .................................. 2010-039225

(51) Int. Cl.
*G09G 5/00* (2006.01)
*H04M 1/21* (2006.01)
(Continued)

(52) U.S. Cl.
CPC ................. *H04M 1/21* (2013.01); *G03B 21/53* (2013.01); *G05B 19/4069* (2013.01); *G06F 3/0481* (2013.01); *G06T 3/40* (2013.01); *G06T 3/4007* (2013.01); *H04M 1/0214* (2013.01);
(Continued)

(58) Field of Classification Search
CPC ....... G06T 3/40; G06T 3/4007; G06F 3/0481; H04N 1/3935; G05B 19/4069
USPC ........ 345/156, 668, 620; 353/121, 28, 69, 70, 353/101, 122, 39, 119; 348/744, 745, 746, 348/747, 806
See application file for complete search history.

(56) References Cited

U.S. PATENT DOCUMENTS 7,234,819 B2 *  6/2007  Nonaka et al. ................... 353/69
7,874,683 B2 *  1/2011  Noba ............................... 353/39
(Continued)

FOREIGN PATENT DOCUMENTS

JP    2006287863 A    10/2006
JP    2007096542 A    4/2007
(Continued)

OTHER PUBLICATIONS

International Search Report and Written Opinion for PCT/JP2011/054168, dated Mar. 22, 2011.

*Primary Examiner* — Abderrahim Merouan
(74) *Attorney, Agent, or Firm* — Hauptman Ham, LLP

(57) ABSTRACT

According to an aspect, a mobile electronic device includes an image projecting unit, a distance detecting unit, and a processing unit. The image projecting unit projects an image to a projection plane. The distance detecting unit detects a distance from the image projecting unit to the projection plane. The processing unit causes the image projecting unit to project a projection image including at least part of a reference image in such a manner that a ratio of the projection image to a whole of the reference image is changed based on the change in the distance detected by the distance detecting unit.

27 Claims, 10 Drawing Sheets

(51) Int. Cl.
  *G06T 3/40* (2006.01)
  *H04N 1/393* (2006.01)
  *G06F 3/0481* (2013.01)
  *G05B 19/4069* (2006.01)
  *G03B 21/53* (2006.01)
  *H04M 1/02* (2006.01)

(52) U.S. Cl.
  CPC ......... *H04M1/0272* (2013.01); *H04M 2250/12* (2013.01); *H04N 1/3935* (2013.01)

(56) References Cited

U.S. PATENT DOCUMENTS

| | | | |
|---|---|---|---|
| 8,007,111 B2* | 8/2011 | Kojima | 353/28 |
| 8,159,594 B2 | 4/2012 | Nitta et al. | |
| 8,480,237 B2* | 7/2013 | Tamura | 353/70 |
| 8,744,521 B2* | 6/2014 | Kim et al. | 455/556.1 |
| 2003/0032478 A1* | 2/2003 | Takahama | A63F 13/04 463/30 |
| 2005/0024606 A1* | 2/2005 | Li et al. | 353/121 |
| 2005/0068501 A1* | 3/2005 | Nonaka et al. | 353/30 |
| 2006/0152478 A1* | 7/2006 | Simon | 345/156 |
| 2007/0249396 A1* | 10/2007 | Nitta et al. | 455/556.1 |
| 2009/0027387 A1* | 1/2009 | Furuhashi | G06T 15/20 345/421 |
| 2009/0102987 A1* | 4/2009 | Kojima | H04N 9/3188 348/744 |
| 2010/0123772 A1* | 5/2010 | Kawakami et al. | 348/51 |
| 2010/0137026 A1* | 6/2010 | Kim et al. | 455/556.1 |
| 2010/0174421 A1* | 7/2010 | Tsai et al. | 700/302 |
| 2010/0190524 A1* | 7/2010 | Morozumi | 455/556.1 |
| 2011/0019239 A1* | 1/2011 | Kojima | G06F 3/0488 358/401 |
| 2011/0242506 A1* | 10/2011 | Uchiyama et al. | 353/98 |
| 2012/0214546 A1* | 8/2012 | Osaka | 455/556.1 |
| 2013/0222646 A1* | 8/2013 | Tsubota et al. | 348/239 |

FOREIGN PATENT DOCUMENTS

| | | |
|---|---|---|
| JP | 2008096457 A | 4/2008 |
| WO | 2006033245 A1 | 3/2006 |

* cited by examiner

MOBILE ELECTRONIC DEVICE, IMAGE PROJECTING METHOD AND PROJECTION SYSTEM

CROSS-REFERENCE TO RELATED APPLICATION

This application is a National Stage of PCT international application Ser. No. PCT/JP2011/054168 filed on Feb. 24, 2011 which designates the United States, and which is based upon and claims the benefit of priority from Japanese Patent Application No. 2010-039225, filed on Feb. 24, 2010.

FIELD

The present disclosure relates to a mobile electronic device with an image projector for projecting an image and a projection system.

BACKGROUND

There is conventionally a so-called projector as a device for projecting an image. The projector is used in a fixed state at a predetermined location, and projects an image on a given portion of a wall surface or a screen.

Recently, on the other hand, a mobile projector compact in size and easy to carry is proposed as the projector. For example, Patent Literature 1 describes a mobile terminal with a projector function that is provided with an upper cabinet, a lower cabinet, and a hinge for mutually pivotally connecting the upper cabinet and the lower cabinet, and is also provided with a built-in projector including a lens and a light source.

CITATION LIST

Patent Literature

Patent Literature 1: Japanese Patent Application Laid-Open No. 2007-96542

Technical Problem

As for the projector, to largely display an image, it is necessary to enlarge a screen by operating image data or by increasing a distance between the projector and the screen.

For the foregoing reasons, there is a need for a mobile electronic device and a projection system capable of appropriately changing image projection by a simple operation.

SUMMARY

According to an aspect, a mobile electronic device includes: a housing; an image projecting unit provided in the housing for projecting an image; a distance detecting unit for detecting a distance from the image projecting unit to a projection plane where the image projected by the image projecting unit is displayed; and a processing unit for causing the image projecting unit to project a projection image including at least part of a reference image. The processing unit changes a ratio of the projection image to a whole of the reference image based on the change in the distance detected by the distance detecting unit.

According to an aspect, when it is detected that, compared with a first distance detected by the distance detecting unit, a second distance detected after the detection of the first distance is shorter, the processing unit more reduces the ratio of the projection image to the whole of the reference image.

According to an aspect, the processing unit sets a reference projection distance, and makes a size of a target object in a projection image to be projected based on the reference projection distance the same as a size of a target object in a projection image to be projected based on the distance detected by the detecting unit.

According to an aspect, the processing unit sets the projection image to be projected based on the reference projection distance, as the reference image.

According to an aspect, when it is detected that, compared with a first distance detected by the distance detecting unit, a second distance detected after the detection of the first distance is shorter, the processing unit makes wider a projection angle at which an image is projected when the detection of the second distance is detected as compared with a projection angle at which an image is projected when the first distance is detected.

According to an aspect, the mobile electronic device further includes a movement detecting unit for detecting a movement of the image projecting unit in a horizontal direction with respect to the projection plane of the image projecting unit. The processing unit calculates a movement direction in the horizontal direction with respect to the projection plane of the image projecting unit detected by the movement detecting unit, and projects an image closer to the movement direction side in the reference image than the projection image before the movement is detected, as a projection image after the detection of the movement.

According to an aspect, the mobile electronic device includes an imaging unit for capturing an image in a direction in which the image projecting unit projects the image. The processing unit sets a projection angle at which an image is projected based on the image captured by the imaging unit.

According to an aspect, a mobile electronic device includes: a housing; an image projecting unit provided in the housing for projecting an image; a movement detecting unit for detecting a movement of the housing in a direction in which the image projecting unit projects an image; and a processing unit for causing the image projecting unit to project a projection image including at least part of a reference image. The processing unit changes a ratio of the projection image projected by the image projecting unit to a whole of the reference image based on information for the movement detected by the movement detecting unit.

According to an aspect, when the movement direction is a direction of approaching to the projection plane, the processing unit more reduces the ratio of the projection image projected by the image projecting unit to the whole of the reference image.

According to an aspect, a projection system includes: a housing; an image projecting unit provided in the housing for projecting an image; an information acquiring unit provided in the housing for acquiring either one of or both of information for a distance between the image projecting unit and a projection plane to which the image projecting unit projects an image and information for a movement of the housing in a direction along the direction in which the image projecting unit projects an image; a processing unit provided outside the housing for causing the image projecting unit to project a projection image including at least part of a reference image; and a communication unit for transmitting and receiving a signal between the image projecting unit or the information acquiring unit and the processing unit. The processing unit changes a ratio of the projection image to a whole of the reference image based on the information acquired by the information acquiring unit.

Advantageous Effects of Invention

The present invention can display an image with its size changed, that is, in an enlarged or reduced manner, by an easy and intuitive operation.

DESCRIPTION OF EMBODIMENTS

The present invention will be explained in detail below with reference to the drawings. It should be noted that the present invention is not limited by the following explanation. In addition, components in the description below encompass components that readily occur to those skilled in the art, that are substantially identical, or that fall into so-called equivalent ranges. In the followings, a mobile phone is discussed as an example of a mobile electronic device; however, a target to which the present invention is applied is not limited to the mobile phones. Therefore, the present invention is also applicable to, for example, PHSs (Personal Handy-phone Systems), PDAs, portable navigation devices, notebook computers, gaming devices, etc.

Figure 1:
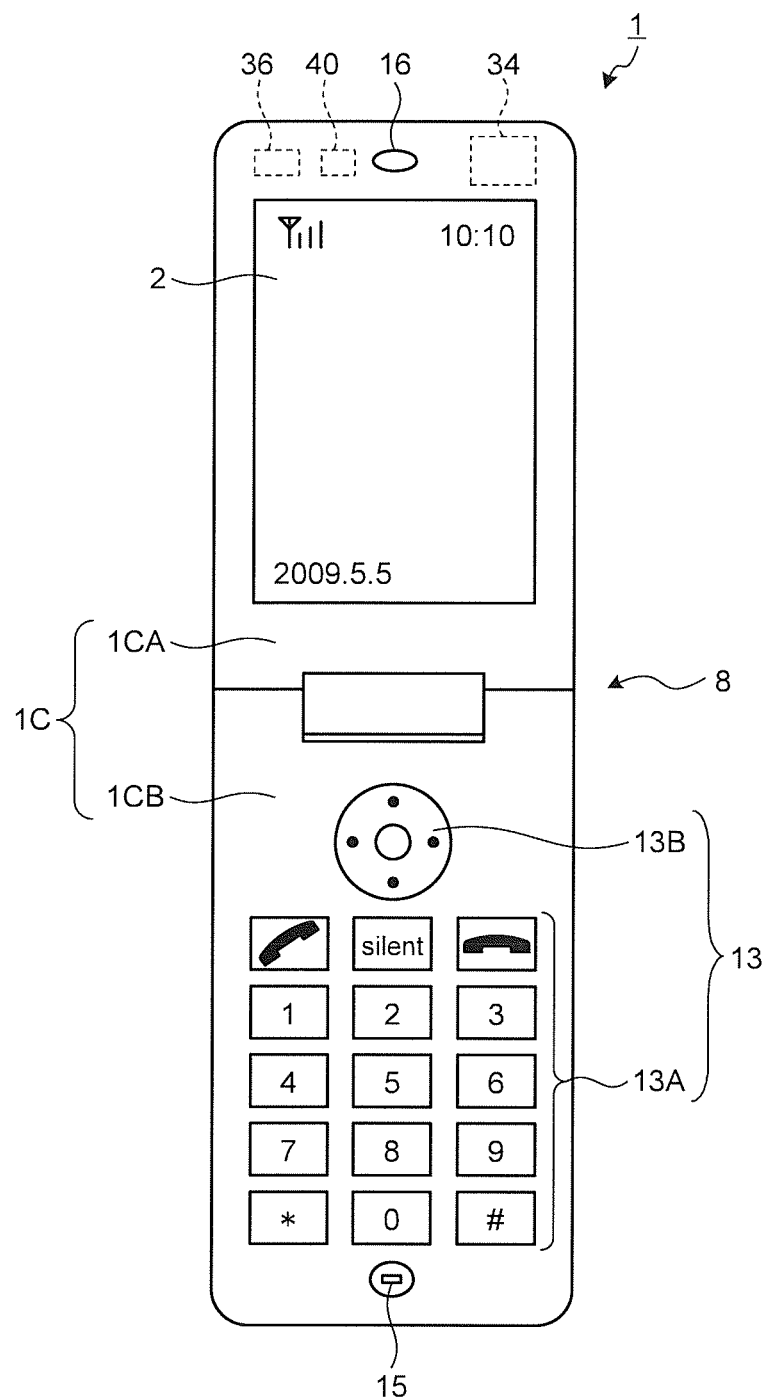
FIG. 1 is a front view of a schematic configuration of a mobile electronic device according to an embodiment.
Figure 2:
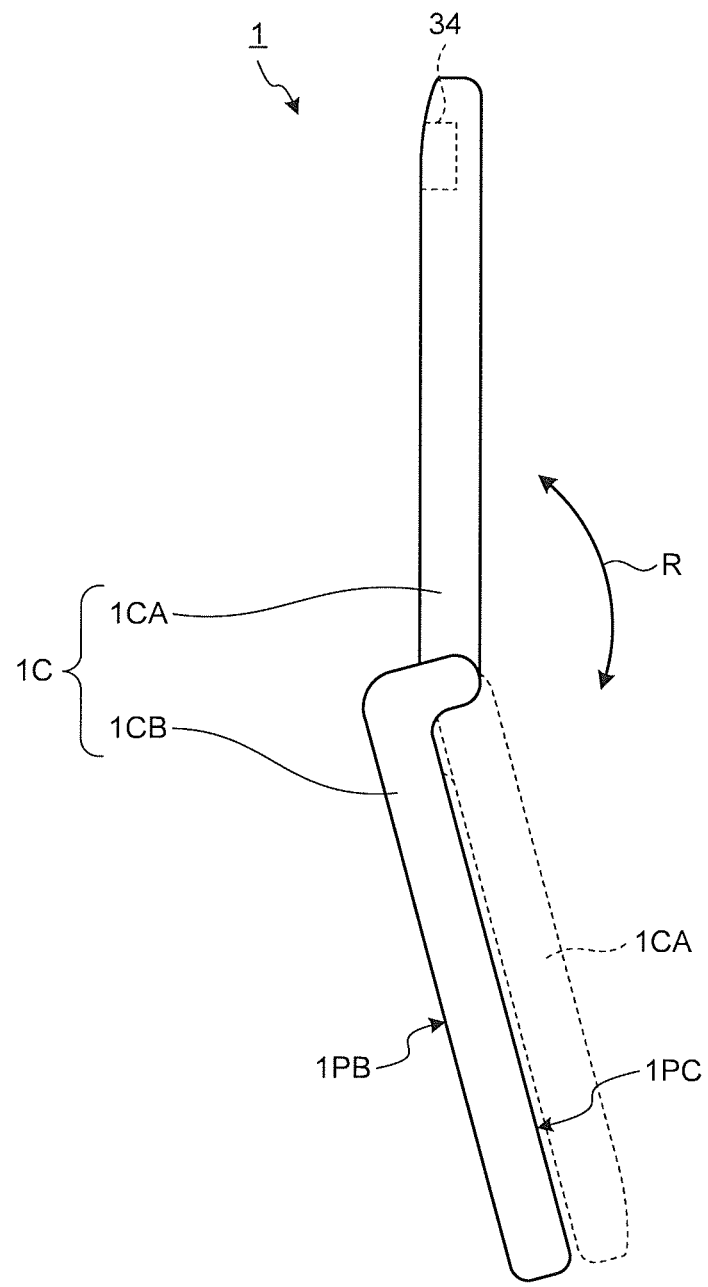
FIG. 2 is a side view of the mobile electronic device illustrated in FIG. 1.

FIG. 1 is a front view of a schematic configuration of a mobile electronic device according to an embodiment, and FIG. 2 is a side view of the mobile electronic device illustrated in FIG. 1. A mobile electronic device 1 illustrated in FIG. 1 and FIG. 2 is a mobile phone that includes a wireless communication function, an output unit, a sound acquiring unit, and an imaging unit. The mobile electronic device 1 has a housing 1C formed with a plurality of housings. Specifically, the housing 1C is formed with a first housing 1CA and a second housing 1CB which are openable and closable. That is, the mobile electronic device 1 has a folding housing. However, the housing of the mobile electronic device 1 is not limited to this configuration. For examples, the housing of the mobile electronic device 1 may be a sliding housing with two housings in which one housing and the other housing can mutually slide each other from a state where both the housings are overlapped, a rotating housing in which one of housings is made to rotate around an axis line along an overlapping direction, or a housing in which two housings are coupled to each other via a two-axis hinge.

The first housing 1CA and the second housing 1CB are coupled to each other by a hinge mechanism 8 being a connection. By coupling the first housing 1CA and the second housing 1CB with the hinge mechanism 8, both the first housing 1CA and the second housing 1CB can pivot around the hinge mechanism 8 so as to pivot in a direction farther away from each other and a direction closer to each other (directions indicated by arrow R in FIG. 2). When the first housing 1CA and the second housing 1CB pivot in the direction farther away from each other, the mobile electronic device 1 is opened, while when the first housing 1CA and the second housing 1CB pivot in the direction closer to each other, the mobile electronic device 1 is closed, to become a folded state (state indicated by dotted line in FIG. 2).

The first housing 1CA includes a display 2 illustrated in FIG. 1 as a display unit. The display 2 displays a standby image when the mobile electronic device 1 awaits reception, and displays a menu image used to assist the operations of the mobile electronic device 1. The first housing 1CA also includes a receiver 16 being an output unit that outputs a sound during a telephone call on the mobile electronic device 1.

The second housing 1CB includes a plurality of operation keys 13A used to input a telephone number of an intended party and a text when a mail is composed, and also includes a direction and decision key 13B so as to easily perform selection and decision of a menu displayed on the display 2 and perform scrolling of a screen, or the like. The operation keys 13A and the direction and decision key 13B constitute an operating unit 13 of the mobile electronic device 1. Provided in the second housing 1CB is a microphone 15 being the sound acquiring unit that receives a sound during a telephone call on the mobile electronic device 1. The operating unit 13 is provided on an operating face 1PC of the second housing 1CB as illustrated in FIG. 2. The face opposite to the operating face 1PC is a back face 1PB of the mobile electronic device 1.

An antenna is internally provided in the second housing 1CB. The antenna is a transmitting/receiving antenna used for wireless communication, and is used for transmission and reception of radio waves (electromagnetic waves) for telephone calls and electronic mails and so on between the mobile electronic device 1 and a base station. The second housing 1CB includes the microphone 15. The microphone 15 is provided on the side of the operating face 1PC of the mobile electronic device 1 illustrated in FIG. 2.

Provided in the first housing 1CA on the opposite side to the hinge mechanism 8 are a projector 34 being an image projector, a distance sensor 36 being a distance measuring unit for measuring a distance from a light emitting portion (objective lens) of the projector 34 to an image projection target, and a camera 40 for imaging (capturing) an image on a plane where the image is projected. This configuration enables the projector 34 to project an image to a projection target and enables the distance sensor 36 to measure a distance between the light emitting surface of the projector 34 and the projection target and to automatically focus the image projected by the projector 34. The light emitting portion of the projector 34 and an imaging window of the camera 40 are exposed to the outside of the first housing 1CA.

Figure 3:
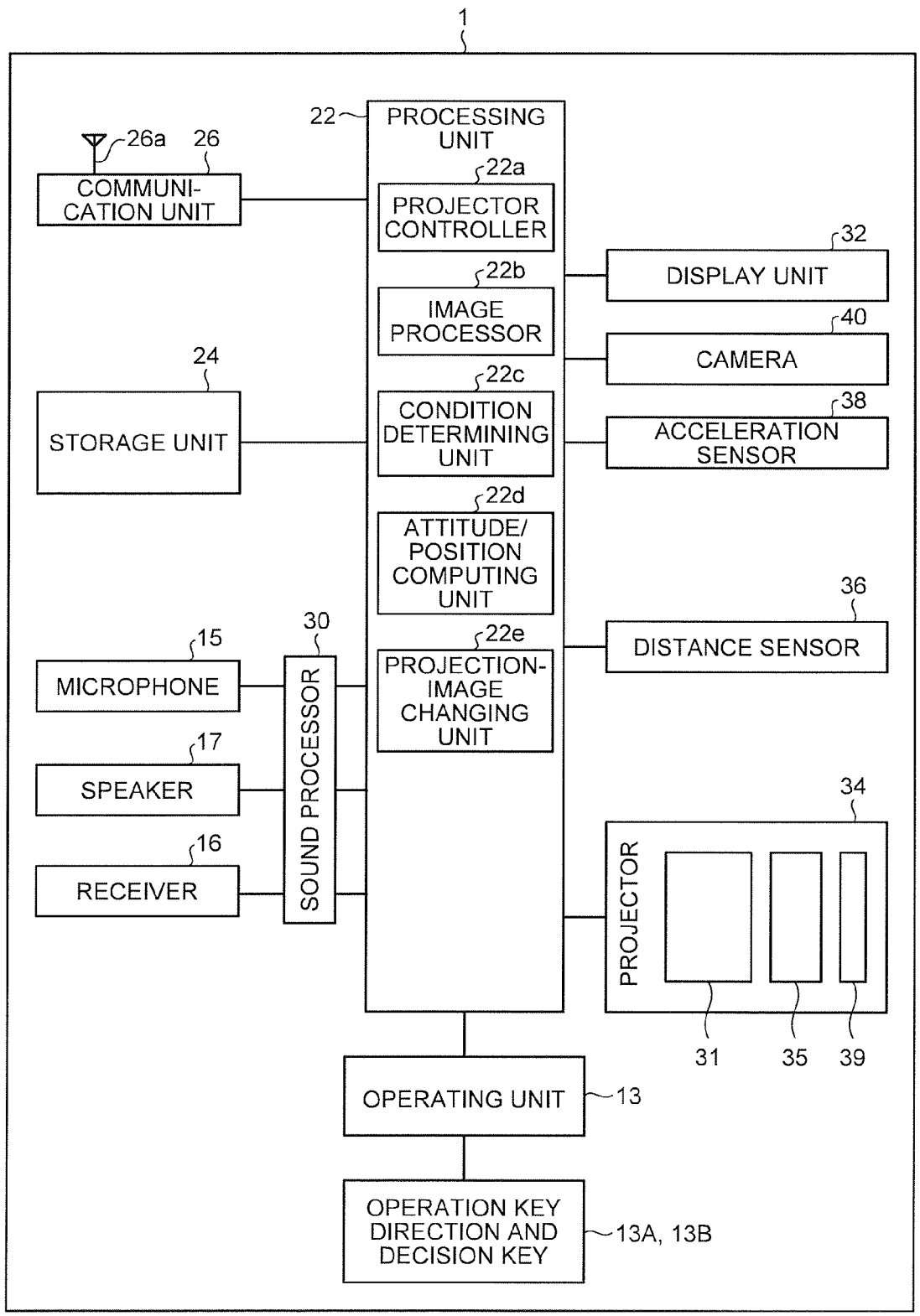
FIG. 3 is a block diagram of a schematic configuration of functions of the mobile electronic device illustrated in FIG. 1 and FIG. 2.

FIG. 3 is a block diagram of a schematic configuration of functions of the mobile electronic device illustrated in FIG. 1 and FIG. 2. As illustrated in FIG. 3, the mobile electronic device 1 includes a processing unit 22, a storage unit 24, a communication unit 26, the operating unit 13, a sound processor 30, a display unit 32, the projector 34, the distance sensor 36, an acceleration sensor 38 being a move detector, and the camera 40. The processing unit 22 includes a function of integrally controlling an entire operation of the mobile electronic device 1. That is, the processing unit 22 controls the operations of the communication unit 26, the sound processor 30, the display unit 32, and the like so that various processes of the mobile electronic device 1 are executed in an appropriate procedure according to an operation through the operating unit 13 and software stored in the storage unit 24 of the mobile electronic device 1.

The various processes of the mobile electronic device 1 are, for example, voice phone conversation over a line switching network, composition and transmission/reception of electronic mail, and browsing of Web (World Wide Web) sites on the Internet. The operations of the communication unit 26, the sound processor 30, the display unit 32, and so on are, for example, signal transmission/reception by the communication unit 26, sound input/output by the sound processor 30, and image display by the display unit 32.

The processing unit 22 executes various processes based on programs (for example, operating system programs and application programs) stored in the storage unit 24. The processing unit 22 is formed with, for example, MPU (Micro Processing Unit), and executes the various processes of the mobile electronic device 1 according to the procedure instructed by the software. That is, the processing unit 22 successively reads operation codes from the operating system programs, the application programs, or so stored in the storage unit 24 to perform the processes.

The processing unit 22 has a function of executing a plurality of application programs. The application program executed by the processing unit 22 includes a plurality of application programs such as an application program for controlling the drive of the projector 34 and the distance sensor 36, an application program for reading various image files (image information) from the storage unit 24 and decoding them, and an application program for causing the display unit 32 to display an image obtained by being decoded or for causing the projector 34 to project the image.

In the present embodiment, the processing unit 22 includes a projector controller 22a, an image processor 22b, a condition determining unit 22c, an attitude/position computing unit 22d, and a projection-image changing unit 22e. Functions respectively provided in the projector controller 22a, the image processor 22b, the condition determining unit 22c, the attitude/position computing unit 22d, and the projection-image changing unit 22e are implemented by hardware resources being formed with the processing unit 22 and the storage unit 24 and performing each task assigned by a control unit of the processing unit 22. The task mentioned here represents a unit of processing in which some processes cannot be simultaneously executed, of all processes performed by the application software or of processes performed by the same application software.

The storage unit 24 stores therein software and data used for processes executed by the processing unit 22, and stores therein a task activating an application program that controls the drive of the projector 34 and the distance sensor 36, and a task activating an image processing program. The storage unit 24 stores therein, in addition to the tasks, for example, sound data downloaded through communications, software used by the processing unit 22 to provide control for the storage unit 24, an address book in which telephone numbers, mail addresses, and so on of the other parties in communication are written for management, a sound file such as a dial tone and a ring tone, and temporary data used in the processing process of the software, and the like.

The computer program and the temporary data used in the processing process of the software are temporarily stored in a work area of the storage unit 24 assigned thereto by the processing unit 22. The storage unit 24 includes, for example, nonvolatile storage devices (nonvolatile semiconductor memory such as ROM: Read Only Memory, a hard disk drive, and so on) and a readable/writable storage device (e.g., SRAM: Static Random Access Memory, and DRAM: Dynamic Random Access Memory).

The communication unit 26 includes an antenna 26a, and establishes a wireless signal path using CDMA (Code Division Multiple Access) system or so with a base station via a channel assigned by the base station and performs telephone communication and information communication with the base station. The operating unit 13 includes the operation keys 13A respectively assigned with various functions such as a power key, a talk key, numeric keys, character keys, direction keys, a decision key, and a send key; and the direction and decision key 13B. When any one of the keys receives an input through a user operation, the key generates a signal corresponding to the content of the user's operation. The generated signal is input to the processing unit 22 as an instruction of the user.

The sound processor 30 performs processes on a sound signal input to the microphone 15 and a sound signal output from the receiver 16 or a speaker 17. That is, the sound processor 30 amplifies the sound input through the microphone 15, subjects the sound to AD conversion (Analog-to-Digital conversion), thereafter, subjects the sound to signal processing such as encoding, converts the sound to digital sound data, and outputs the converted sound data to the processing unit 22. The sound processor 30 subjects the sound data sent from the processing unit 22 to processes such as decoding, DA conversion (Digital-to-Analog conversion), and amplification, converts the sound signal to an analog sound signal, and then outputs the converted sound signal to the receiver 16 or the speaker 17. The speaker 17 is disposed in the housing 1C of the mobile electronic device 1, and outputs a ring tone, a send tone of mail, or the like.

The display unit 32 includes the display 2, and displays a video picture according to video data and an image according to image data supplied from the processing unit 22 on a display panel. The display 2 is formed with a display panel including LCD (Liquid Crystal Display), an organic EL (Organic Electro-Luminescence) panel, or so. The display unit 32 may include a sub-display in addition to the display 2.

The projector 34 includes a light source and an optical system for switching whether to project or not light emitted from the light source based on the image data. In the present invention, the projector 34 includes a visible-light irradiation device (visible-light irradiating unit) 31 being the light source, a drawing device 35 being the optical system, and a focus adjustment device 39. The visible-light irradiation device 31 irradiates visible laser light. The light in a visible light region is a light whose short wavelength side is from 360 nm to 400 nm and whose long wavelength side is from 760 nm to 830 nm. In the embodiment, the visible-light irradiation device 31 irradiates lights in three colors of R (Red), G (Green), and B (Blue).

The drawing device 35 synthesizes the lights in three colors irradiated from the visible-light irradiation device 31, and irradiates the image projection target with the synthesized lights. The drawing device 35 includes a switching element for switching whether to pass or not the light emitted from the light source therethrough, and a mirror for causing the light having passed through the switching element to perform raster scan. The drawing device 35 changes an angle of the laser light emitted from the visible-light irradiation device 31 by the mirror and scans the laser light on the image projection target, to thereby project the image to the image projection target.

Used as the mirror is, for example, an MEMS (Micro Electro Mechanical System) mirror. The MEMS mirror uses a piezoelectric element to drive the mirror, scans the visible light irradiated from the visible-light irradiation device 31, and generates a visible image and an invisible image. In this case, the mirror is used to change an angle of the light irradiated from the light source and scan the light irradiated from the light source over the whole surface of the image projection target, so that the visible image or the invisible image is projected to the image projection target. As explained above, the projector 34 is a scan type projector. The configuration of the projector 34 is not limited to the projector that uses the laser as a light source. For example, the projector 34 may be a projector that uses a halogen light, an LED light source, or an LD light source as a light source and includes an LCD (Liquid Crystal Monitor) or a DMD (Digital Micro-mirror Device) provided in the optical system.

The focus adjustment device 39 includes a function (focus adjustment function) of forming a visible image projected from the drawing device 35 on the image projection target by an instruction sent from the projector controller 22a. The focus adjustment device 39 is provided with, for example, a focus adjustment mechanism including a movable lens and so on, and moves the lens to implement the focus adjustment function. In addition, the focus adjustment device 39 may implement the focus adjustment function by causing the image processor 22b to subject image data projected by the projector 34 to predetermined image processing. Furthermore, the focus adjustment device 39 may implement the focus adjustment function by the focus adjustment function and the image processing. The distance sensor 36 measures a distance between the light emitting portion of the projector 34 and the image projection target. The function, in the focus adjustment device 39, of adjusting a focus of the image projected from the projector 34 may be used, instead of the distance sensor 36, to measure a distance between the light emitting portion of the projector 34 and the image projection target.

Figure 4:
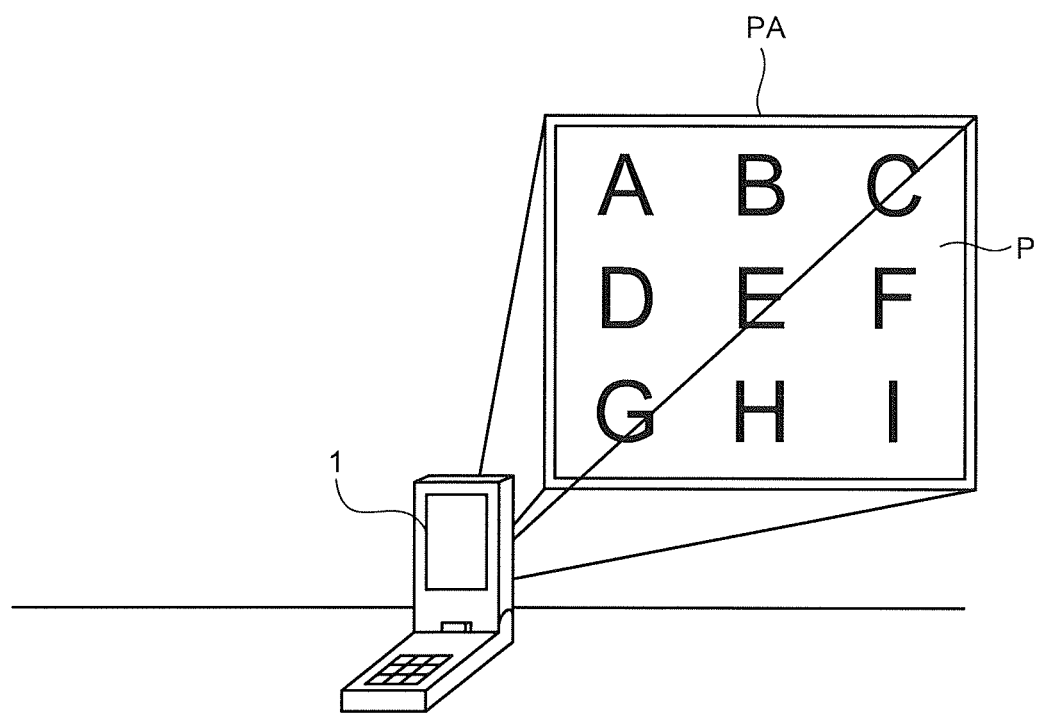
FIG. 4 is an explanatory diagram of a state in which an image is displayed by a projector of the mobile electronic device illustrated in FIG. 1.

FIG. 4 is an explanatory diagram of a state in which an image is displayed by the projector of the mobile electronic device illustrated in FIG. 1. As explained above, the projector 34 is the image projector that projects an image, and its image projecting surface is exposed to the outside of the housing 1C of the mobile electronic device 1. The mobile electronic device 1 projects an image from the projector 34 and thereby enables to project an image P on a predetermined area (projection area) PA, as illustrated in FIG. 4, of the image projection target (e.g., a wall surface and a screen) at a location facing the image projecting surface of the projector 34. The projector 34 is controlled its operation by the processing unit 22, and projects various pictures such as a moving image and a presentation material sent from the processing unit 22, to be displayed in the projection area PA.

The camera 40 is an imaging system that is disposed near the light emitting portion of the projector 34 and captures an image in an area including the projection area. That is, the camera 40 captures an image in an emission direction of light from the projector 34. The camera 40 is the imaging system that captures an image at a wider field angle than a projection field angle of an image projected by the projector 34, and can capture an image of a wider area than a projection area where an image is projected by the projector 34. The mobile electronic device 1 is configured basically in the above manner.

Figure 5:
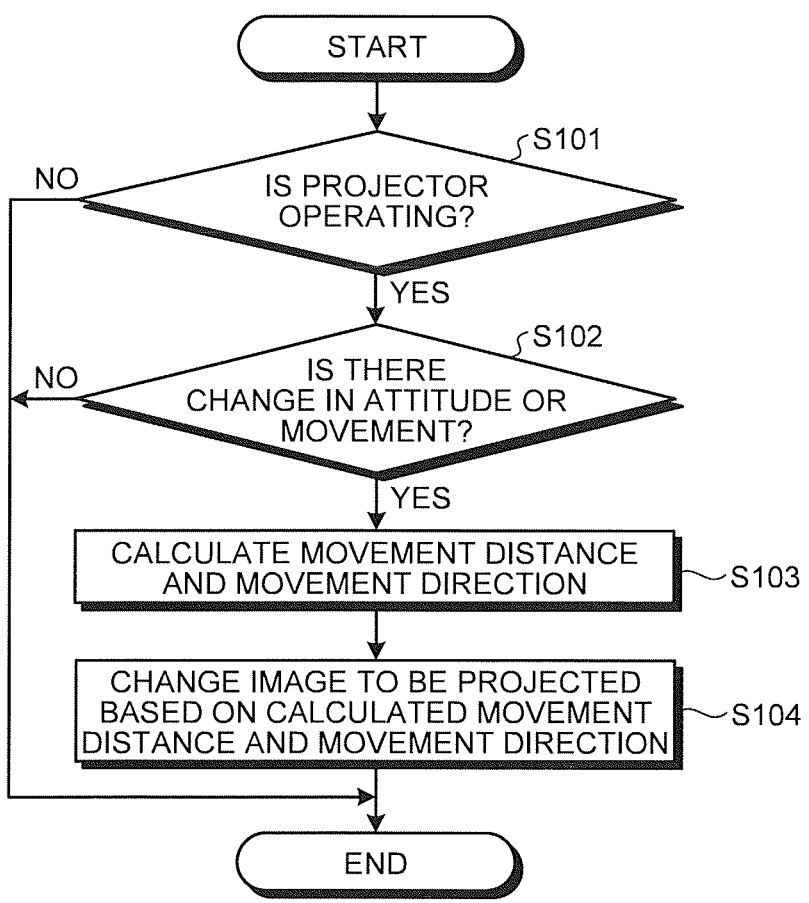
FIG. 5 is a flowchart of an example of an operation of the mobile electronic device.

Then, an image projection operation of the projector of the mobile electronic device is explained with reference to FIG. 5. FIG. 5 is a flowchart of an example of an operation of the mobile electronic device. First of all, at Step S101, in the processing unit 22 of the mobile electronic device 1, the condition determining unit 22c determines whether the projector 34 built into the mobile electronic device 1 is in use. When it is determined at Step S101 that the projector is not operating (No), that is, when the condition determining unit 22c determines that the projector 34 is not in use, the processing unit 22 ends the present control.

When it is determined at Step S101 that the projector is operating (Yes), that is, when the condition determining unit 22c determines that the projector 34 is in use, then at Step S102, the processing unit 22 determines whether there is a change in attitude or a movement. Namely, in the processing unit 22, the condition determining unit 22c determines at Step S102 whether the projector 34 in the mobile electronic device 1 has moved, that is, whether there is a change in attitude of or a movement of the projector 34 (mobile electronic device 1). The condition determining unit 22c can determine whether there is a change in attitude of or a movement of the projector 34 based on an image captured by the camera 40 and a focal length calculated by an auto-focus function. The condition determining unit 22c can also determine whether there is a change in attitude of or a movement of the projector 34 by using detection results of the distance sensor 36 and the acceleration sensor 38. In the present embodiment, the condition determining unit 22c also determines a relative movement between the projection plane and the projector 34 as a movement of the projector 34. That is, the condition determining unit 22c determines a change in the distance between the projection plane and the projector 34 as a movement. Alternatively, when detecting a move of proceeding toward a projection direction (the projection plane along the projection direction) or a move of retreating, the condition determining unit 22c may also determine that there is a movement. When it is determined at Step S102 that there is no change and movement (No), that is, when the condition determining unit 22c determines there is no move in the projector 34, the processing unit 22 ends the present control.

When it is determined at Step S102 that there is a change in attitude or a movement (Yes), that is, when the condition determining unit 22c determines there is a move in the projector 34, then Step S103, the attitude/position computing unit 22d calculates a movement distance and a movement direction based on the move of the projector 34 (mobile electronic device 1). Namely, the attitude/position computing unit 22d calculates a change in a distance between the projector 34 and the projection plane to which an image is projected. Specifically, the processing unit 22 detects a distance between the projection plane and the projector 34 based on the detection results of the camera 40 or the distance sensor 36 and the acceleration sensor 38, and compares the detected distance with a reference distance or with a previously detected distance, to calculate a movement distance and a movement direction.

The processing unit 22 calculates the movement distance and the movement direction at Step S103, and causes, at Step S104, the projection-image changing unit 22e to move the projection area of the projector 34 based on the movement amount and the movement direction calculated at Step S103, and causes the projector 34 to project an image, different from the image in the projection area before the movement, into a projection area after the movement. After the end of the process at Step S104, the processing unit 22 ends the present control. The processing unit 22 periodically repeats the processes during operation for the image by the projector 34.

Figure 6:
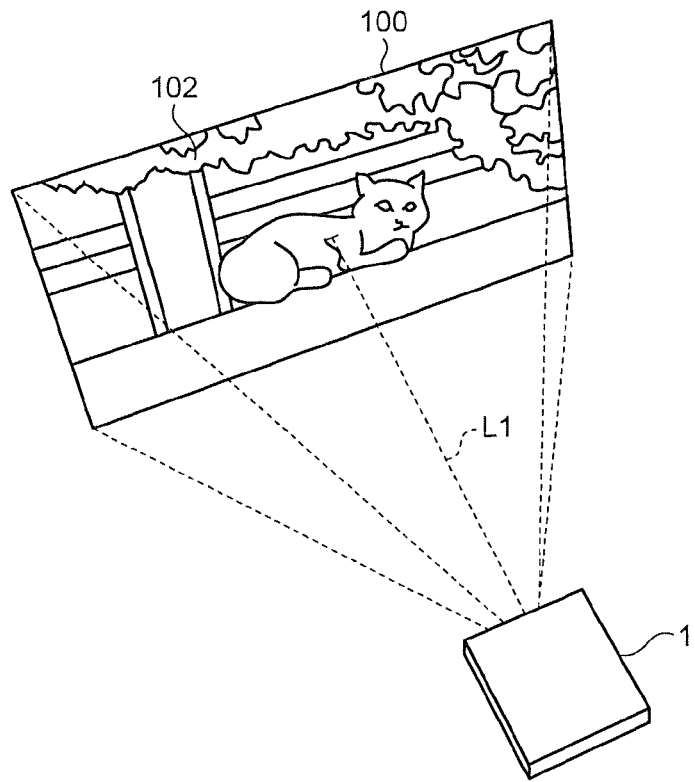
FIG. 6 is an explanatory diagram for explaining the operation of the mobile electronic device.
Figure 7:
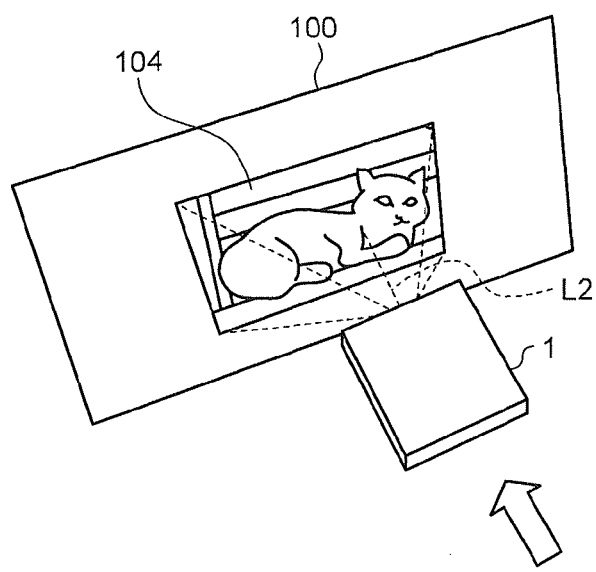
FIG. 7 is an explanatory diagram for explaining the operation of the mobile electronic device.
Figure 8:
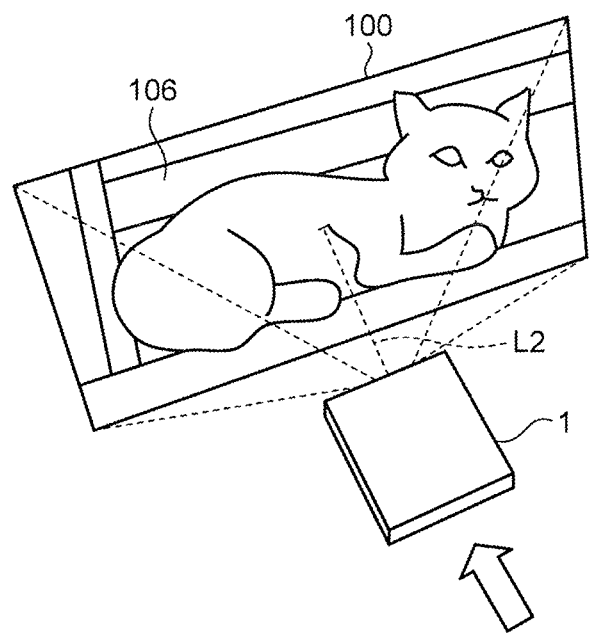
FIG. 8 is an explanatory diagram for explaining the operation of the mobile electronic device.

Then, the mobile electronic device 1 is explained in more detail below using a specific example. FIG. 6 to FIG. 8 are explanatory diagrams for explaining operations of the mobile electronic device. FIG. 6 to FIG. 8 schematically represent the shape of the mobile electronic device 1. First of all, the mobile electronic device 1 projects an image 102 on a projection plane 100 as illustrated in FIG. 6. At this time, a distance between the mobile electronic device 1 and the projection plane 100 is L1. The image 102 is an image in which a cat lies on a hence with trees in the background. In the present embodiment, the image 102 represents a whole area of the image as a projection target, which is a reference image.

Thereafter, the mobile electronic device 1 and the projection plane 100 are relatively moved from the state illustrated in FIG. 6, and, as illustrated in FIG. 7, when the distance between the mobile electronic device 1 and the projection plane 100 becomes L2, then the mobile electronic device 1 projects an image 104 from the projector 34 to the projection plane 100. A relation at this time between the distance L1 and the distance L2 is expressed as L2<L1. The image 104 is an image obtained by clipping a part of the image 102. That is, the projection image is the image obtained by clipping a part of the reference image. The image 104 is smaller than the image 102 on the projection plane 100. Moreover, the image 104 projected to the projection plane 100 and the image portion, of the image 102 projected to the projection plane 100, corresponding to the image 104 are substantially the same as each other in absolute size. The mobile electronic device 1 sets the distance L1 illustrated in FIG. 6 as a reference, and calculates a change in the area of an image to be projected from a ratio of the distance L1 to the distance L2. Furthermore, an image to be projected from the projector 34 is changed according to the change in the area. Specifically, by enlarging the image to be projected on the data, the areas of elements (target object) forming an image to be displayed on the projection plane can be made constant, that is, in the present embodiment, the size of the cat on the projection plane 100 can be made constant.

In this way, the mobile electronic device 1 changes an image to be projected to the projection plane, that is, an image to be output from the projector 34 based on the distance between the projection plane 100 and the mobile electronic device 1. In other words, the mobile electronic device 1 changes a ratio of a projection image to the whole reference image. Specifically, a more enlarged image is projected as the distance between the projection plane 100 and the mobile electronic device 1 becomes smaller or as the movement amount at which the mobile electronic device 1 is closer to the projection plane (projection direction) becomes larger. Namely, the ratio of the projection image to the whole reference image is more reduced. In addition, a more reduced image is projected as the distance between the projection plane 100 and the mobile electronic device 1 becomes larger or as the movement amount at which the mobile electronic device 1 is farther away from the projection plane (projection direction) becomes larger. Namely, the ratio of the projection image to the whole reference image is more increased. This enables the user to enlarge or reduce an image to be displayed (projection image) by such a simple operation that the location of the mobile electronic device 1 or the projection plane 100 is moved.

The mobile electronic device 1 is carried to be used by the user. Therefore, if the distance between the mobile electronic device 1 and the projection plane 100 becomes smaller, the distance between the user and the projection plane 100 becomes smaller. Therefore, even if the corresponding portion of the image to be projected to the projection plane does not become large and the sizes of both the images are substantially the same as each other, it is easier for the user to see a target portion of the screen.

If the user approaches the projection plane 100 while holding the mobile electronic device 1, the target portion can be made easier to see, thus enabling an intuitive operation. Namely, as explained above, if the image is not changed, the user has to move farther away from the screen in order to increase the image; however, in this case, the user has only to approach it in order to more increase the image. Therefore, if the image is desired to be more visible, the user can perform an intuitive operation such as approaching the projection plane.

The embodiment is configured not to change the image portion to be projected to the projection plane, that is, to adjust the projection image so that the size of a target object in the image is constant on the projection plane; however, the present invention is not limited thereto. The mobile electronic device 1 has only to increase (extend an image and trim a part of the image) an image to be output from the projector 34 as the distance to the projection plane becomes smaller. Namely, it is only necessary to more reduce the ratio of the projection image to the whole reference image. That is, by enlarging an image to be output from the projector 34 as the distance is shorter, that is, by more reducing the ratio of the projection image to the whole reference image, regardless of a ratio in the enlargement, the mobile electronic device 1 can make the image more visible than the case in which an image to be projected is constant regardless of the distance to the projection plane (in the case of maintaining the projection image as the reference image).

The mobile electronic device 1 may change a projection angle of the projector 34 that projects an image based on the distance between the mobile electronic device 1 and the projection plane 100, based on the distance between the mobile electronic device 1 and the projection plane 100. Specifically, as illustrated in FIG. 8, when the distance between the mobile electronic device 1 and the projection plane 100 becomes L2, the mobile electronic device 1 projects an image 106 from the projector 34 to the projection plane 100. The image 106 is an image obtained by clipping a part of the image 102. The image 106 has the same size as the image 102 on the projection plane 100. Therefore, the image 106 is such that a portion of the image 102 is more largely displayed than the corresponding area of the image 102. Specifically, the cat in the image is largely displayed.

The projection angle of the projector 34 can be changed by changing an operation range of the mirror that forms the drawing device 35. In other words, by increasing a swing angle (angle of rotation) of the mirror, the image can be output at a wider angle. The projection angle may be changed by disposing a lens in the light emitting portion of the projector 34 and adjusting the position of the lens and the position of the light source.

In this way, the mobile electronic device 1 changes an image to be projected based on the distance between the mobile electronic device 1 and the projection plane 100 and changes the projection area, so that the corresponding area can be more largely displayed. Thus, the user only approaches the projection plane 100 while holding the mobile electronic device 1, so that a more enlarged image can be projected to the projection plane 100.

In the embodiment, the projection area of an image is changed by a mechanical structure such as a change in the swing angle of the mirror or so; however, the present invention is not limited thereto. For example, when the distance between the mobile electronic device 1 and the projection plane 100 is a certain distance or more, the mobile electronic device may display an image only in a part of an image-projection possible area, and project an image using a larger area where the image is not displayed as the distance between the mobile electronic device 1 and the projection plane 100 becomes smaller. The control in this case can be implemented, in the control method of FIG. 7, by performing settings so as to, at the beginning, display an image using only a part of the image-projection possible area and display the image enlarged by a change amount or more of the distance as the distance becomes smaller.

Figure 9:
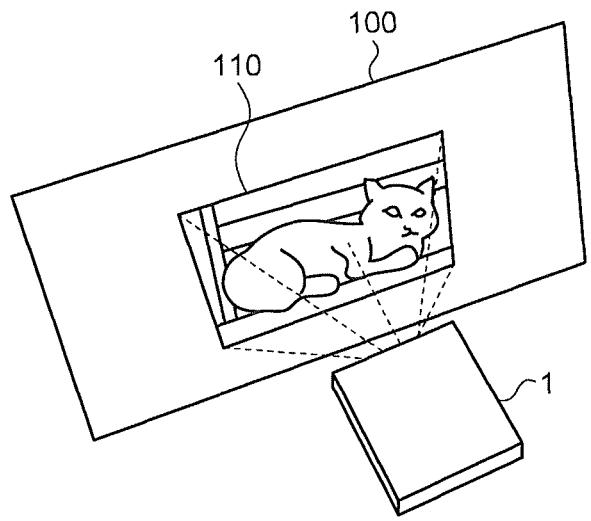
FIG. 9 is an explanatory diagram for explaining the operation of the mobile electronic device.
Figure 10:
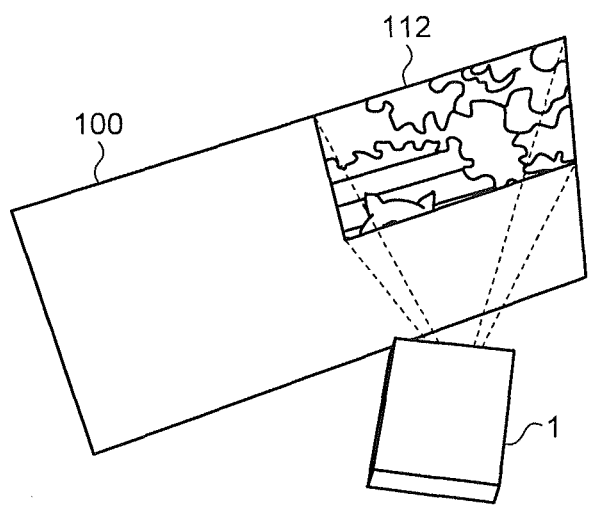
FIG. 10 is an explanatory diagram for explaining the operation of the mobile electronic device.

The mobile electronic device 1 may switch between images to be projected also according to the direction of the mobile electronic device 1 (housing IC, projector 34). That is, in the embodiment, an enlarged display process (trimming process) is performed on all the images in such a manner that the center of an image (original image data) whose display has been set is determined as the center of an image to be projected; however, the present invention is not limited thereto. For example, the mobile electronic device 1 may project a part of the image 102 corresponding to the area to which the image is projected by the projector 34, using the projection plane 100 when the image 102 is projected, as the reference. FIG. 9 and FIG. 10 are explanatory diagrams for explaining the operation of the mobile electronic device. FIG. 9 and FIG. 10 schematically represent the shape of the mobile electronic device 1.

First of all, as illustrated in FIG. 9, when the center of the projection plane 100 is used as a projection area, the mobile electronic device 1 causes the projector 34 to output the image corresponding to the center of the image 102 and display an image 110 on the projection plane 100. That is, the image of the cat at the center of the image 102 is displayed. As illustrated in FIG. 10, the direction of the mobile electronic device 1 is changed in this state, and when the right upper side of the projection plane 100 is determined as the projection area, the projector 34 projects an image corresponding to the right upper portion of the image 102 to display an image 112. Namely, the projector 34 projects the image including a part of the cat and the background tree which are in the right upper portion of the image 102.

The direction of the mobile electronic device 1 and the area to which the projector 34 projects an image may be calculated by performing image analysis using images captured by the camera 40 or by using detection results of the acceleration sensor 38. When both the mobile electronic device 1 and the projection plane 100 are moved, the camera 40 is preferably used to detect them.

In this way, by adjusting the image to be projected based on the direction of the mobile electronic device 1 in addition to the distance between the mobile electronic device 1 and the projection plane 100, the user can display a desired portion of the image only by changing the direction of the mobile electronic device 1. Moreover, by determining the position of an image displayed at a reference position as the reference, the user can intuitively operate an image to be displayed.

When the mobile electronic device 1 causes the projector 34 to start projection of an image, a setting method of a projection area (projection angle) to which an image is projected used can be any one of various methods. For example, the projection area may be displayed using a preset size. The user may arbitrarily adjust it.

The mobile electronic device 1 may automatically detect a projection possible area and project an image to the detected projection possible area. In this way, by automatically detecting the projection possible area, the operation can be made easier. In addition, by detecting the projection possible area, it is possible to prevent an image from being projected to any area where projection is not possible. Thereby, for example, even if there are people around and an image is to be projected to a projection possible sheet-like member held by the user's hand, the image can be projected only to the sheet-like member. Thereby, it is possible to prevent causing light to be leaked to an end area of the sheet-like member and giving annoyance to those around the user.

Figure 11:
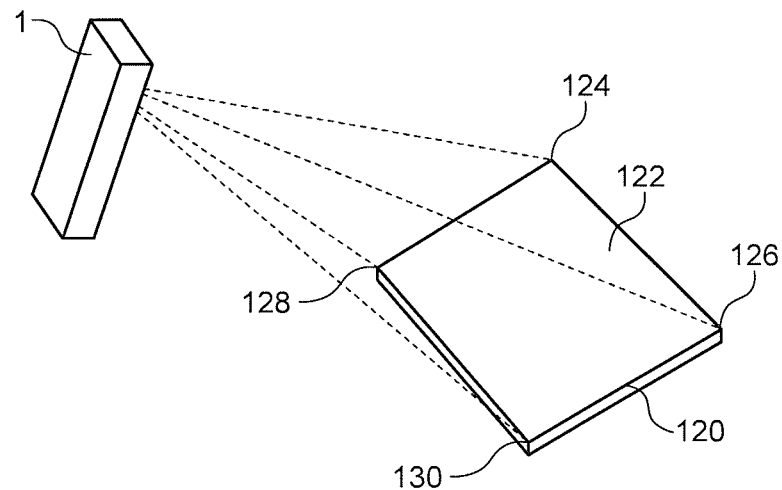
FIG. 11 is an explanatory diagram for explaining the operation of the mobile electronic device.
Figure 12:
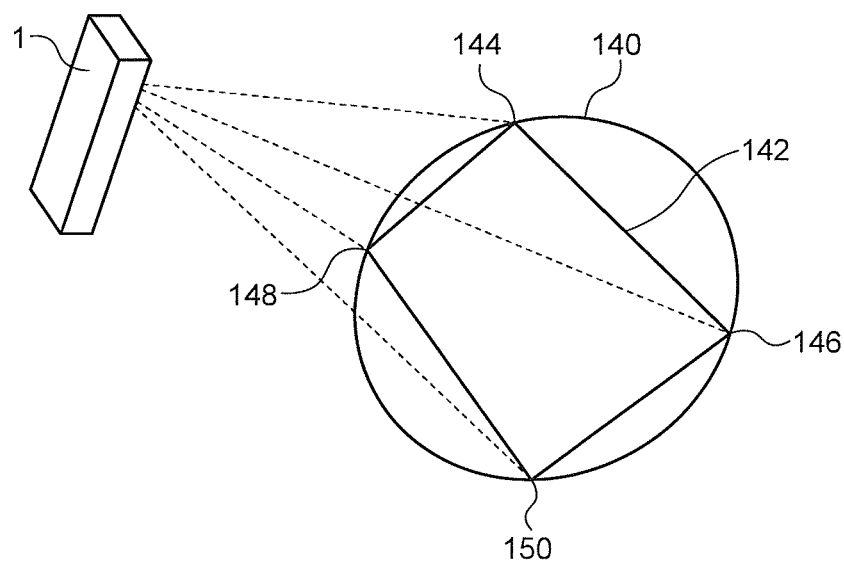
FIG. 12 is an explanatory diagram for explaining the operation of the mobile electronic device.

The projection possible area is obtained by detecting four corners of a member in a direction in which the projector projects light and by calculating a projection angle based on the detected area and distance, and an image is projected to the projection possible area. The operations are explained below with reference to FIG. 11 and FIG. 12. FIG. 11 and FIG. 12 are explanatory diagrams for explaining the operations of the mobile electronic device.

First of all, the mobile electronic device 1 illustrated in FIG. 11 causes the camera 40 to capture an image in a direction in which the projector 34 projects light. Namely, the camera 40 captures an image including a rectangular sheet-like member 120. The processing unit 22 detects a distance between the mobile electronic device 1 and the sheet-like member 120 and positions of four corners of the sheet-like member 120 based on the image captured by the camera 40 and focus position information. Specifically, the processing unit 22 detects corners 124, 126, 128, and 130. The distance between the mobile electronic device 1 and the sheet-like member 120 may be a distance to its center position, or may be a distance to each of the corners.

When detecting the distance between the mobile electronic device 1 and the sheet-like member 120 and the corners 124, 126, 128, and 130, the mobile electronic device 1 determines a projection angle based on the results of the detection, and processes a size in data of image data to be projected based on the projection angle. Thereafter, the mobile electronic device 1 projects an image 122 to the sheet-like member 120.

In this way, by detecting the four corners and adjusting the projection area, the size of an image, and the like, the image with the same size as the sheet-like member 120 can be projected. In the embodiment, the sheet-like member 120 has a flat surface; however, in a case of a curved surface, in a case of a shape in combination of the curved surface and the flat surface, or in a case in which the sheet-like member 120 is inclined with respect to the center of the light emitting direction of the projector, it is only necessary to correct the image data to a trapezoidal shape, or to calculate a curvature radius R of the curved surface to correct the image data.

Then, FIG. 12 represents a case of projecting an image to a circular sheet-like member 140. First of all, the mobile electronic device 1 illustrated in FIG. 12 causes the camera 40 to capture an image in a direction in which the projector 34 projects light. Namely, the camera 40 captures an image including the sheet-like member 140. The processing unit 22 detects a distance between the mobile electronic device 1 and the sheet-like member 140 and positions corresponding to four corners of the sheet-like member 140 based on the image captured by the camera 40 and focus position information. Specifically, the processing unit 22 detects corners of an area, in the sheet-like member 140, by which a largest rectangular area corresponding to an image to be projected can be secured. Specifically, the processing unit 22 detects four points, points 144, 146, 148, and 150, as the corners.

When detecting the distance between the mobile electronic device 1 and the sheet-like member 140 and the points 144, 146, 148, and 150, the mobile electronic device 1 determines a projection angle based on the results of the detection, and processes a data size of image data to be projected based on the projection angle. Thereafter, the mobile electronic device 1 projects an image 142 to the sheet-like member 140. Thereby the image 142 with the points 144, 146, 148, and 150 as the four corners is projected to the sheet-like member 140.

In this way, even if the shape of a projection target member (the surface thereof) is not a rectangle, by setting an area based on a projection possible area of the projection target member, an image to be projected can be prevented from being projected to any area other than the projection target member. In the embodiment, the sheet-like member has a circular shape; however, the same goes for a case of a triangular shape or a case of a shape in combination of a plurality of curved lines.

The mobile electronic device 1 may be configured such that, when a plurality of projection possible areas are detected, the user can select one of them. This enables an image to be projected to an area that the user determines as the best area. An image may be displayed to a plane where it can be displayed in the largest size.

In the embodiment, the image is a rectangle; however, the mobile electronic device 1 may switch a shape to be detected according to an outline of an image to be projected. For example, when an image to be projected is a circular shape, an area where the largest size of the circular shape can be detected may be detected from the projection target member.

When detecting that the shape of the image projection target is changed, the mobile electronic device 1 may set again an image projection area. This enables to prevent an image from being projected to any area other than the projection target area.

The mobile electronic device 1 may be configured to enable detection of a change in the shape of the image projection target and to control so as not to project an image only to a portion where the shape is changed and the image cannot thereby be projected. In other words, if the sheet-like member is a soft member and a part thereof is bent, an image in a bent portion may not be projected. This enables to prevent an image from being projected to any area other than the projection target area. In addition, the size of an image to be projected can be prevented from being changed.

When the change in the shape of the image projection target becomes a give value or more (threshold or more), the mobile electronic device 1 may stop the image projection. Thereby, the user intentionally closes or deforms the image projection target, so that a projection function can be stopped. Moreover, even when fluctuation not intended by the user occurs, it is possible to prevent light from being emitted in an unintended direction.

In detecting an image projection area, if it is dark (given brightness or less), the mobile electronic device 1 may emit light from a light of the camera or from the projector to detect the shape of an image projection target. This enables the shape of the image projection target to be adequately detected. In this case, by projecting light only upon the detection or by gradually increasing the output of light and finishing the emission of the light in response to detection of the image projection area, the light can be suppressed from being circumferentially leaked. When a camera capable of capturing also an infrared image is used as the camera 40, the projection target area can be detected without outputting the light.

In the embodiment, because an image can be projected to various types of target object, an image is captured by the camera 40 and an image projection target is detected from an outer shape of the member; however, the operations are not limited thereto. For example, when an image is projected to a particular member, a mark capable of detecting a relative position is put on the particular member, so that the position of the detected mark may be set as a position of a corner. By providing a transmitter or so on the particular member, the position of the transmitter may be detected. In this case, the image projection area and its position can be determined without capturing the image with the camera.

In the embodiment, because an image displayed on the projection plane can be adequately adjusted or because a relative change between the projection plane and the mobile electronic device can be detected, the size of the image projected (output) from the projector is changed based on the distance between the projection plane and the mobile electronic device; however, the present invention is not limited thereto. The mobile electronic device may change the size of the image to be projected (output) from the projector, that is, may change a ratio of a projection image to the whole reference image based on only the movement of the housing. In other words, the mobile electronic device may calculate a movement amount of the housing in the direction in which the projector projects an image and change the size of the image projected (output) from the projector, that is, may change a ratio of a projection image to the whole reference image based on the movement amount. The movement amount of the mobile electronic device can be calculated based on the detection result of the acceleration sensor. In this way, by changing the size of the image projected (output) from the projector, that is, by changing the ratio of the projection image to the whole reference image based on the movement amount of the mobile electronic device, the user can also perform intuitive operation. In addition, by approaching the screen, the image can be largely displayed or the image can be displayed so as to be easy to see. Moreover, by using only the detection result of the acceleration sensor, the calculation can be implemented, so that the device configuration and the processes can be made simple. In this case, the mobile electronic device can perform the processes in the same manner as above by displaying a larger image as a movement amount at which the mobile electronic device approaches the projection plane is larger, that is, by displaying an image whose ratio to the whole reference image is smaller as the projection image, and by displaying a smaller image as the movement amount at which the mobile electronic device is away from the projection plane is larger, that is, by displaying an image whose ratio to the whole reference image is larger as the projection image.

Figure 13:
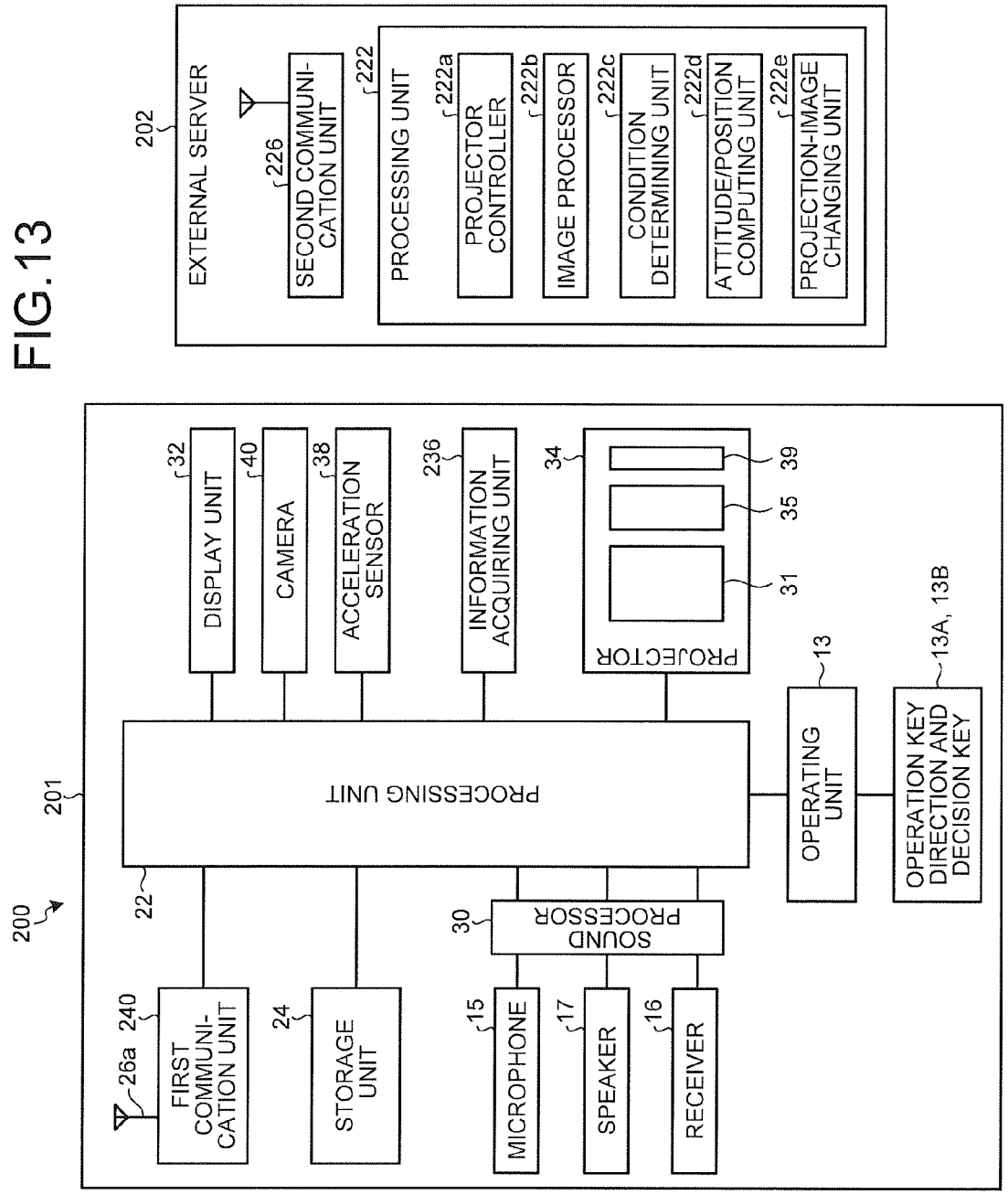
FIG. 13 is a block diagram of a schematic configuration of functions of a projection system.

In the above explanation, the example in which the mobile electronic device performs the processes and operations related to all the projections is described; however, a projection system in which an external server performs the functions of the processing unit may be adopted. The projection system is explained below with reference to FIG. 13. FIG. 13 is a block diagram of a schematic configuration of functions of the projection system. As illustrated in FIG. 13, a projection system 200 includes a mobile electronic device 201 and an external server 202. In the projection system 200, at least part of the functions of the processing unit 22 is performed by a processing unit 222 of the external server 202 or so.

The mobile electronic device 201 includes, similarly to the mobile electronic device 1, the operating unit 13 with the operation keys 13A and the direction and decision key 13B, the microphone 15, the receiver 16, the speaker 17, the processing unit 22, the storage unit 24, the projector 34, the acceleration sensor 38 that detects a move of the housing, and the camera 40. The mobile electronic device 201 also includes a first communication unit 240 that transmits/receives information (signal) to/from an external device. The first communication unit 240 has the same configuration as that of the communication unit 26.

Instead of the detector (distance sensor 36) that detects a distance between the housing of the mobile electronic device 201 and the projection plane, the mobile electronic device 201 includes an information acquiring unit 236 that is provided in the housing of the mobile electronic device and acquires either one of or both of information for the distance from the housing to the projection plane to which an image is projected and information for movement of the housing in a direction along the direction in which the image projector projects an image. The mobile electronic device 201 transmits the information acquired by the information acquiring unit 236 to the processing unit 222 of the external server 202 through the first communication unit (communication unit) 240.

The external server 202 includes the processing unit 222 that can perform at least part of the functions as that of the processing unit 22, illustrated in FIG. 3, of the mobile electronic device 201 and a second communication unit (communication unit) 226 that transmits/receives information (signal) to/from the mobile electronic device 201. The processing unit 222 includes a projector controller 222a, an image processor 222b, a condition determining unit 222c, an attitude/position computing unit 222d, and a projection-image changing unit 222e. Each unit of the processing unit 222 includes the same function as that of each unit of the processing unit 22 of the mobile electronic device 1, and executes processes.

In the projection system 200, the information acquired by the mobile electronic device 201 is transmitted to the external server 202, where the processing unit 222 performs various controls on the information, so that the image to be projected by the projector 34 can be controlled according to the distance between the housing and the projection plane, similarly to the mobile electronic device 1. The external server 202 executes the computation, so that the load on CPU of the processing unit 22 of the mobile electronic device 201 can be reduced. By using the external server 202 with a high-throughput, higher control can be performed more easily.

The projection system 200 may transmit/receive a signal using a high-speed communication method such as LTE (Long Term Evolution) as communication performed between the mobile electronic device 201 and the external server 202, that is, between the first communication unit 240 and the second communication unit 226. This enables reduction of the load on CPU inside the mobile electronic device 201.

In the projection system 200, the processing unit 222 may calculate a distance based on the information for the distance. Namely, the information for the distance may be transmitted from the mobile electronic device 201 to the external server 202, and the processing unit 222 of the external server 202 may calculate the distance (distance between the housing and the projection plane). The information for the distance may be, for example, a numerical value indicating the distance itself; however, the information is not limited thereto. When the auto-focus function of the camera, for example, is used to detect the distance, the information for the distance may be information for a rotation angle of the lens required to bring the camera into focus. By referring to a table and/or a function indicating a correlation between the information for the rotation angle of the lens and an actual distance, the processing unit 222 may compute so as to obtain information for the distance itself. The table and/or the function are previously stored in any storage unit, so that the processing unit 222 may refer to them. The table and/or the function may be stored in the storage unit 24 of the mobile electronic device 1 or may be stored in a storage unit by providing the storage unit in the external server 202 similarly to the processing unit 222.

When the distance is detected using the intensity of reflected energy of an infrared laser, a visible light, sound waves, or so, the information for the distance may be information for the intensity of the energy. In this case, similarly to the above, a table and/or a function in which the energy function and an actual distance are associated with each other are previously stored in the storage unit, so that the processing unit 222 may refer to them.

Similarly, the processing unit 222 may perform calculation of the movement direction and the distance based on the information for the movement of the housing with respect to the projection plane. The information for the movement may be, for example, a detected value obtained from the acceleration sensor, an acceleration value computed based on the detected value, or information indicating the movement direction obtained from the acceleration value. In this case, the processing unit 222 may be configured to obtain the detected value and perform an arithmetic process or to obtain the acceleration value and perform computation in order to specify the movement direction.

INDUSTRIAL APPLICABILITY

As explained above, the mobile electronic device and the projection system according to the present invention are useful for those provided with a device such as a projector capable of projecting an image.

The invention claimed is:

1. A mobile electronic device, comprising:
   an image projecting unit for projecting an image to a projection plane;
   a distance detecting unit for detecting a distance from the image projecting unit to the projection plane; and
   a processing unit for causing the image projecting unit to project a projection image obtained by clipping a part of a reference image in such a manner that a clipping ratio of the projection image to a whole of the reference image is changed based on the change in the distance detected by the distance detecting unit,
   wherein the projection image in the projection plane after the movement is a different image from the reference image in the projection plane before the movement.

2. The mobile electronic device according to claim 1, wherein,
   when it is detected that, compared with a first distance detected by the distance detecting unit, a second distance detected after the detection of the first distance is shorter,
   the processing unit reduces the clipping ratio of the projection image to the whole of the reference image.

3. The mobile electronic device according to claim 1, wherein
   the processing unit causes the image projecting unit to project the projection image in such a manner that an object in the projection image keeps a constant size on the projection plane regardless of the distance detected by the distance detecting unit.

4. The mobile electronic device according to claim 1, wherein the processing unit sets the projection image to be projected based on a reference projection distance, as the reference image.

5. The mobile electronic device according to claim 1, wherein,
when it is detected that, compared with a first distance detected by the distance detecting unit, a second distance detected after the detection of the first distance is shorter,
the processing unit makes wider a projection angle at which an image is projected when the second distance is detected as compared with a projection angle at which an image is projected when the first distance is detected.

6. The mobile electronic device according to claim 1, further comprising
a movement detecting unit for detecting a movement of the image projecting unit in a horizontal direction with respect to the projection plane of the image projecting unit, wherein
the processing unit changes, when a movement in a first direction is detected by the movement detecting unit, the part of the reference image to be projected to a part shifted to the first direction.

7. The mobile electronic device according to claim 1, further comprising
an imaging unit for capturing an image in a direction in which the image projecting unit projects the image, wherein
the processing unit sets a projection angle at which an image is projected based on the image captured by the imaging unit.

8. The mobile electronic device according to claim 7, further comprising a housing, wherein
the image projecting unit, the distance detecting unit, and the imaging unit are disposed in a same end of the housing.

9. The mobile electronic device according to claim 7, further comprising
a condition determining unit for determining whether there is a change in an attitude or a movement of the image projecting unit based on the image captured by the imaging unit and a focal length calculated by an auto-focus function, wherein,
when the condition determining unit determines that there is the change,
the distance detecting unit detects the distance.

10. The mobile electronic device according to claim 1, wherein,
when it is detected that, compared with a first distance detected by the distance detecting unit, a second distance detected after the detection of the first distance is shorter,
the processing unit outputs the projection image to be larger.

11. The mobile electronic device according to claim 1, wherein,
when the processing unit detects a change of a direction of the image projecting unit,
the processing unit causes the image projecting unit to output a part of the reference image corresponding to the direction of the image projecting unit as the projection image.

12. The mobile electronic device according to claim 1, wherein,
when it is detected that, compared with a first distance detected by the distance detecting unit, a second distance detected after the detection of the first distance is shorter,
the processing unit causes the image projecting unit to output the projection image enlarged compared to the reference image.

13. The mobile electronic device according to claim 1, further comprising
a display unit for displaying the image, wherein
the image projecting unit and the display unit are disposed so as not to overlap with each other in a direction orthogonal to a display surface of the display unit.

14. The mobile electronic device according to claim 1, further comprising
a display unit for displaying the image, wherein
a projection direction of the image projecting unit and an image display direction of the display unit are different from each other.

15. The mobile electronic device according to claim 1, further comprising a housing, wherein
the image projecting unit and the distance detecting unit are disposed in a same end of the housing.

16. The mobile electronic device according to claim 1, further comprising:
an acceleration sensor for detecting acceleration of movement of the mobile electronic device; and
a condition determining unit for determining whether there is a change in an attitude or a movement of the image projecting unit based on detection results of the acceleration sensor, wherein,
when the condition determining unit determines that there is the change,
the distance detecting unit detects the distance.

17. The mobile electronic device according to claim 1, wherein,
the processing unit changes the clipping ratio of the projection image to the whole of the reference image based on a result of comparing a first distance detected by the distance detecting unit and a second distance detected after the detection of the first distance.

18. A mobile electronic device, comprising:
an image projecting unit for projecting an image to a projection plane;
a movement detecting unit for detecting a movement of the image projecting unit in a direction in which the image projecting unit projects an image; and
a processing unit for causing the image projecting unit to project a projection image obtained by clipping a part of a reference image in such a manner that a clipping ratio of the projection image projected by the image projecting unit to a whole of the reference image is changed based on the movement detected by the movement detecting unit,
wherein the projection image in the projection plane after the movement is a different image from the reference image in the projection plane before the movement.

19. The mobile electronic device according to claim 18, wherein,
when a direction of the movement is a direction of approaching to the projection plane,
the processing unit reduces the clipping ratio of the projection image projected by the image projecting unit to the whole of the reference image.

20. The mobile electronic device according to claim 18, wherein,
when it is detected that, compared with a first distance detected by the distance detecting unit, a second distance detected after the detection of the first distance is shorter,
the processing unit outputs the projection image to be larger.

21. The mobile electronic device according to claim 18, wherein,
when the processing unit detects a change of a direction of the image projecting unit,
the processing unit causes the image projecting unit to output a part of the reference image corresponding to the direction of the image projecting unit as the projection image.

22. A projection system, comprising:
a mobile electronic device including
an image projecting unit for projecting an image to a projection plane, and
an information acquiring unit for acquiring at least one of information for a distance between the image projecting unit and the projection plane and information for a movement of the image projecting unit in a direction along the direction in which the image projecting unit projects an image;
a processing unit for causing the image projecting unit to project a projection image obtained by clipping a part of a reference image in such a way that a clipping ratio of the projection image to a whole of the reference image is changed based on the information acquired by the information acquiring unit,
wherein the projection image in the projection plane after the movement is a different image from the reference image in the projection plane before the movement.

23. The projection system according to claim 22, wherein,
when it is detected that, compared with a first distance detected by the distance detecting unit, a second distance detected after the detection of the first distance is shorter,
the processing unit outputs the projection image to be larger.

24. The projection system according to claim 22, wherein,
when the processing unit detects a change of a direction of the image projecting unit,
the processing unit causes the image projecting unit to output a part of the reference image corresponding to the direction of the image projecting unit as the projection image.

25. An image projecting method, comprising:
projecting a projection image obtained by clipping a part of a reference image by an image projecting unit;
detecting a move of the image projecting unit by a detecting unit; and
changing a clipping ratio of the projection image to a whole of the reference image based on the move detected by the detecting unit,
wherein the projection image in the projection plane after the movement is a different image from the reference image in the projection plane before the movement.

26. The image projecting method according to claim 25, further comprising
outputting the projection image to be larger by the processing unit when it is detected that, compared with a first distance detected by the distance detecting unit, a second distance detected after the detection of the first distance is shorter.

27. The image projecting method according to claim 25, further comprising
causing, when the processing unit detects a change of a direction of the image projecting unit, the image projecting unit to output a part of the reference image by the processing unit corresponding to the direction of the image projecting unit as the projection image.

* * * * *